United States Patent
Nagatoshi et al.

(10) Patent No.: US 6,839,186 B2
(45) Date of Patent: Jan. 4, 2005

(54) LARGE NUMERICAL APERTURE OBJECTIVE LENS AND NIGHT VISION OPTICAL DEVICE USING THE SAME

(75) Inventors: Yukiko Nagatoshi, Saitama (JP); Fumio Watanabe, Kumagaya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 604 days.

(21) Appl. No.: 09/905,896

(22) Filed: Jul. 17, 2001

(65) Prior Publication Data

US 2002/0048080 A1 Apr. 25, 2002

(30) Foreign Application Priority Data

Sep. 6, 2000 (JP) ........................................ 2000-269571

(51) Int. Cl.[7] .............................................. G02B 15/14
(52) U.S. Cl. ........................ 359/690; 359/353; 359/785
(58) Field of Search ................................ 359/656–661, 359/676–685, 689–690, 754–792, 350–361, 353–3

(56) References Cited

U.S. PATENT DOCUMENTS

| | | | | |
|---|---|---|---|---|
| 4,610,514 A | * | 9/1986 | Nakamura | ................... 359/746 |
| 6,317,275 B1 | * | 11/2001 | Yoneyama | ................... 359/748 |
| 6,384,975 B1 | * | 5/2002 | Hayakawa | ................... 359/557 |
| 6,600,609 B2 | * | 7/2003 | Yamakawa | ................... 359/754 |

FOREIGN PATENT DOCUMENTS

JP          7-95143           10/1995

* cited by examiner

*Primary Examiner*—Thong Q Nguyen
(74) *Attorney, Agent, or Firm*—Arnold International; Bruce Y. Arnold (57) ABSTRACT

A large numerical aperture objective lens is disclosed having three lens groups. In order from the object side, these lens groups include: a first lens group of positive refractive power that is formed of two positive lens elements and an achromatic set of paired lens elements formed of a lens element of negative refractive power and a lens element of positive refractive power, respectively; a second lens group of negative refractive power; and a third lens group of positive refractive power, with the surface of the third lens group nearest the object side being convex. Specified conditions are satisfied in order to provide a compact, large numerical aperture objective lens having its aberrations favorably corrected as well as to correct for shifts of focus caused by expansion/contraction of the lens barrel with changes in temperature. The objective lens of the invention is particularly suitable for use in a night vision optical device having a photoelectron amplifier tube and an eyepiece, wherein aberrations in the eyepiece are balanced by aberrations of the objective lens.

11 Claims, 6 Drawing Sheets

LARGE NUMERICAL APERTURE OBJECTIVE LENS AND NIGHT VISION OPTICAL DEVICE USING THE SAME

BACKGROUND OF THE INVENTION

A lens is described in Japanese Examined Patent Application (Kokoku) H7-95143 that is well-known as a large numerical aperture objective lens. This lens has an F-number of about 1.85 with a visual field of about 12°, and thus provides a bright telescopic lens which favorably corrects distortion and other aberrations. This lens is well suited for use as an objective lens for a photographic camera or a video camera. However, an objective lens for a night vision optical device that uses a photoelectron amplifier tube must have an even smaller F-number in order to provide a sufficiently bright image. Moreover, an objective lens for a night vision optical device must generally produce a large negative distortion. The reason is that the eyepiece in a night vision optical device generally produces a positive distortion aberration, and correction of such distortion in the eyepiece alone is very difficult. Therefore, a technique is generally used wherein a large negative distortion of about −4% to about −9% is generated in the objective lens for a night vision optical device in order to cancel the positive distortion of the eyepiece. In this manner, favorable correction of distortion of the night vision optical device is provided.

Because the objective lens of a night vision optical device does not require a large back focus, and a compact objective lens is desired, a telescopic lens would normally be suitable, except for the requirement that the objective lens produce a large negative distortion, as described above. Although it would appear that an objective lens having a large negative distortion could be readily designed by simply arranging a surface having a strongly negative refractive power near the object side of a lens system or near the image side of a lens system, such an arrangement makes it difficult, in a compact arrangement of lens elements, to favorably correct both coma and astigmatism.

BRIEF SUMMARY OF THE INVENTION

A first object of the present invention is to provide a compact, large numerical aperture objective lens which provides a bright image and which produces a large negative distortion aberration. A second object of the present invention is to provide a night vision optical device which uses such an objective lens.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

This invention relates to a large numerical aperture objective lens and, more particularly, to a large numerical aperture objective lens suitable for a night vision optical device that uses a photoelectron amplifier tube.

The large numerical aperture objective lens includes, in order from the object side: a first lens group having positive refractive power, a second lens group having negative refractive power, and a third lens group having positive refractive power. The first lens group is formed of, in order from the object side, two positive lens elements and a set of paired lens elements. The set of paired lens elements is achromatic and is formed of a positive lens element and a negative lens element that are either joined or separated by an air space. The lens surface of the third lens group that is nearest the object side is convex, and the following Conditions (1)–(4) are satisfied:

| | |
|---|---|
| $0.45 < \|f_{G1}\|/f < 0.9$ | Condition (1) |
| $0.3 < \|f_{G2}\|/f < 0.7$ | Condition (2) |
| $0.15 < \|R_{G31}\|/f < 0.6$ | Condition (3) |
| $0.4 < D_{G2G3}/f < 0.8$ | Condition (4) | where f is the focal length of the objective lens, $f_{G1}$ is the focal length of the first lens group, $f_{G2}$ is the focal length of the second lens group, $R_{G31}$ is the radius of curvature of the surface of the third lens group nearest the object side, and $D_{G2G3}$ is the on-axis distance between the second lens group and the third lens group.

Moreover, it is desirable that the third lens group include a set of paired lens elements having positive refractive power overall, with the set of paired lens elements being achromatic and formed of a positive lens element and a negative lens element.

Furthermore, it is preferable that, of among the lens elements in the first and second lens groups, that at least one lens element has negative refractive power and is made of a material that satisfies the following Condition (5):

| | |
|---|---|
| $dn/dT > 7 \times 10^{-6}$ | Condition (5) | where dn/dT is the temperature coefficient of the index of refraction of the material at room temperature.

Also, it is preferable that at least one lens element having a positive refractive power in the first lens group is made of a material satisfying the following Conditions (6) and (7):

| | |
|---|---|
| $dn/dT < 0$ | Condition (6) |
| $\alpha > 9 \times 10^{-6}$ | Condition (7) | where dn/dT is the temperature coefficient of the index of refraction of the material at room temperature, and α is the linear expansion coefficient of the material at room temperature.

The night vision optical device of the present invention includes the above-described large numerical aperture objective lens, a photoelectron amplifier tube and an eyepiece.

Moreover, the above "paired lenses" means a cemented lens, or two lenses which are arranged with an air space separating them and which have two surfaces of roughly equal curvature that face one another.

Figure 1:
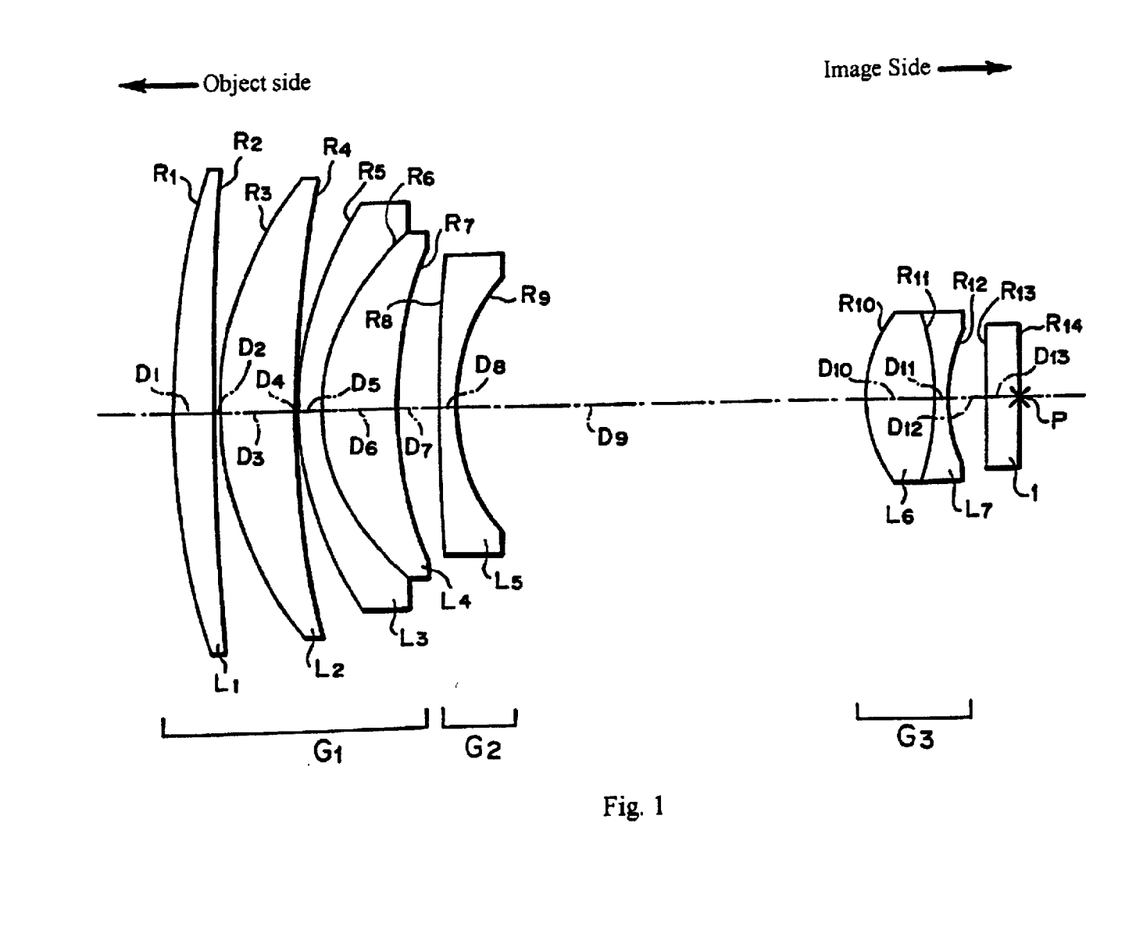
FIG. 1 shows the basic lens element configuration of a large numerical aperture objective lens according to Embodiment 1 of the present invention.

FIG. 1 is representative of the basic lens element configuration of each embodiment of the large numerical aperture objective lens of the invention. This large numerical aperture objective lens includes, in order from the object side, a first lens group $G_1$ having positive refractive power, a second lens group $G_2$ having negative refractive power and a third lens group $G_3$ having positive refractive power. The first lens group $G_1$ includes, in order from the object side, two positive lens elements $L_1$ and $L_2$, and an achromatic set of paired lens elements $L_3$ and $L_4$, formed of a negative and a positive lens element, respectively. The second lens group $G_2$ is formed of a negative lens element $L_5$. The third lens group $G_3$ is formed of an achromatic set of paired lens elements having a surface nearest the object side that is convex. The achromatic set of paired lens elements is formed of a positive lens element $L_6$ and a negative lens element $L_7$ which may be cemented together.

A light beam from an object is converged by these seven lens elements $L_1$–$L_7$ and is imaged onto a surface located at position P. Moreover, the position P in the figure is located at the surface of a face plate (i.e., a cover glass) 1 that forms the plane of incidence of the photo-electron amplifier tube.

This large numerical aperture objective lens of the present invention satisfies the above Conditions (1)–(4).

Figure 2:
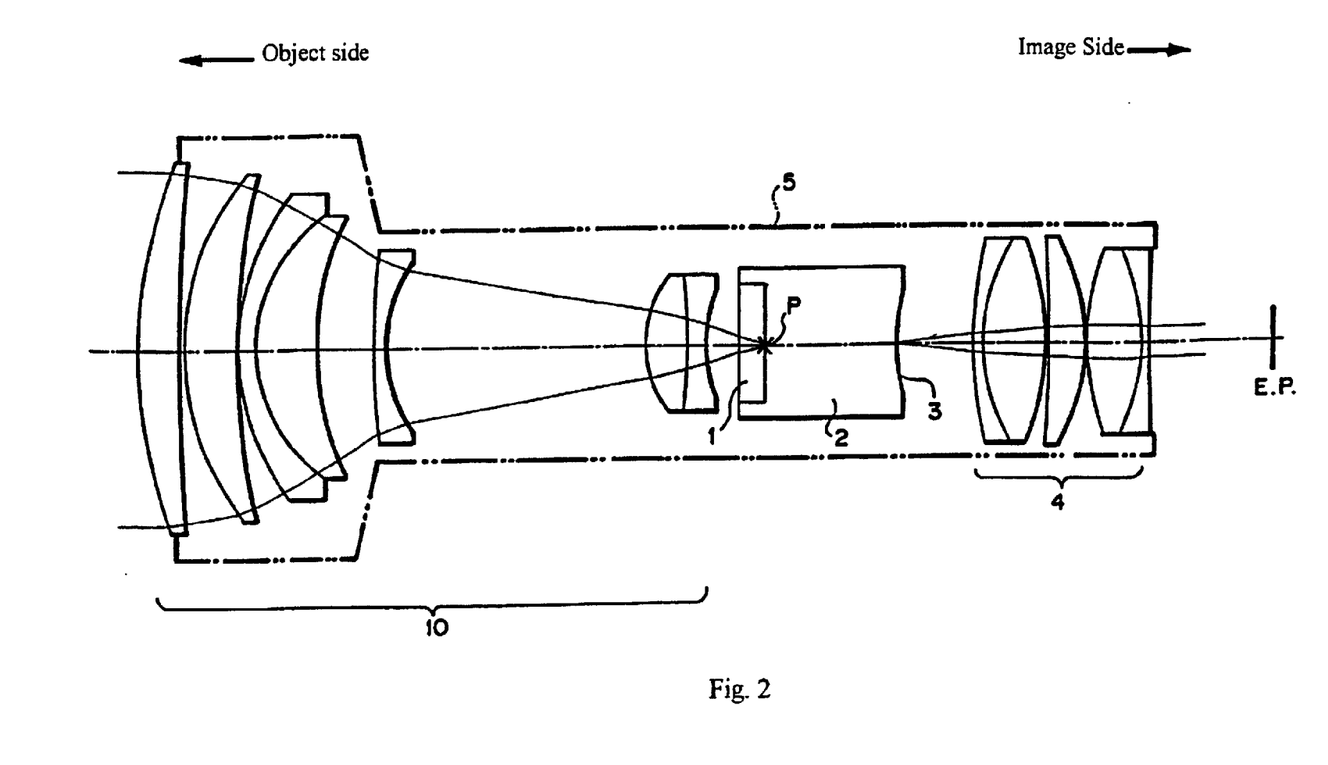
FIG. 2 shows the basic lens element configuration of a night vision optical device that includes the large numerical aperture objective lens shown in FIG. 1.
Figure 3A:
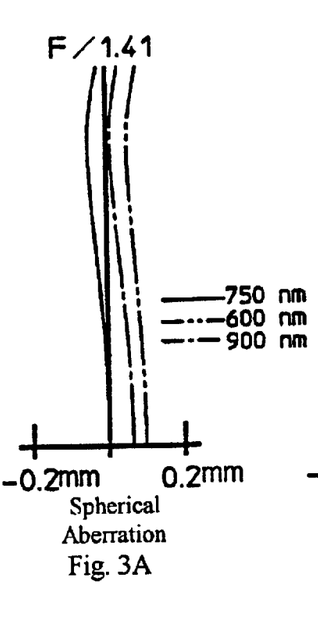
FIGS. 3A–3D show various aberrations of the large numerical aperture objective lens of Embodiment 1 of the present invention.
Figures 3B, 3C:
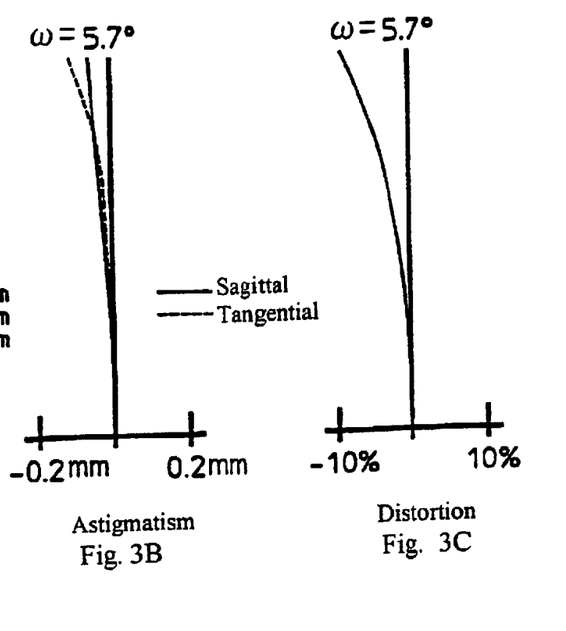
Figure 3D:
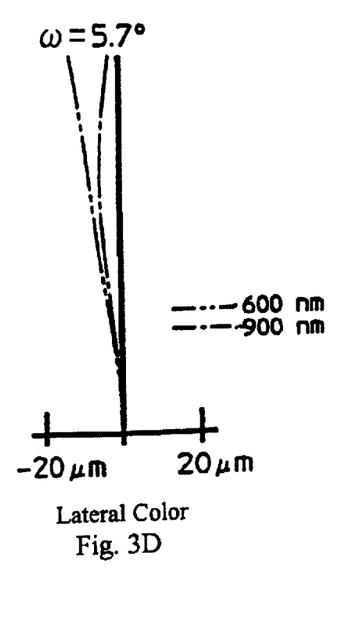
Figure 4A:
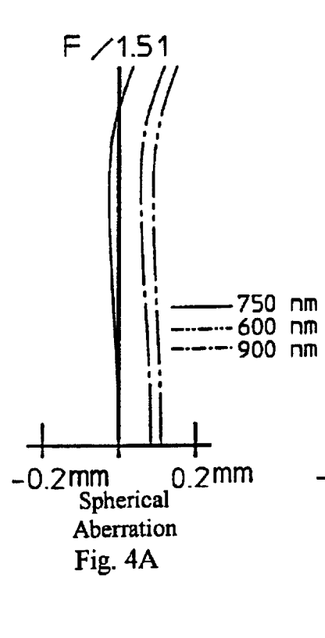
FIGS. 4A–4D show various aberrations of the large numerical aperture objective lens of Embodiment 2 of the present invention.
Figure 4B:
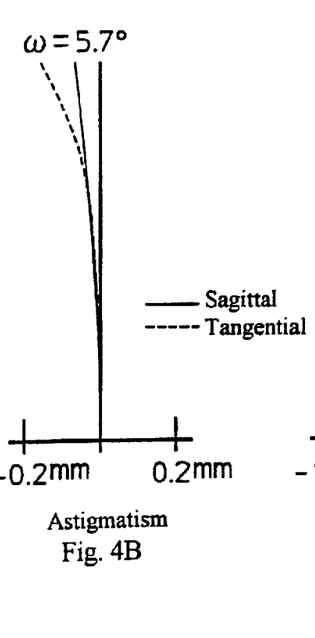
Figure 4C:
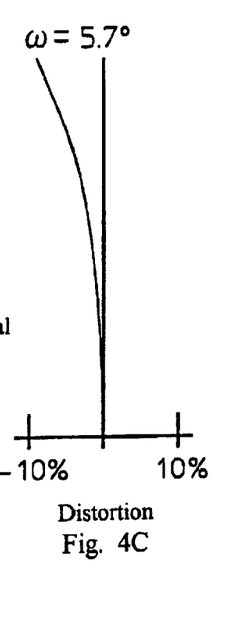
Figure 4D:
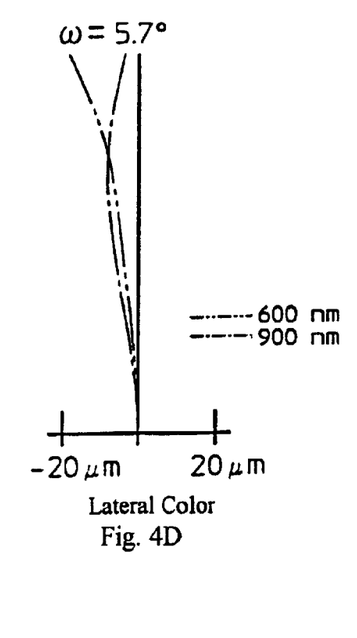
Figure 5A:
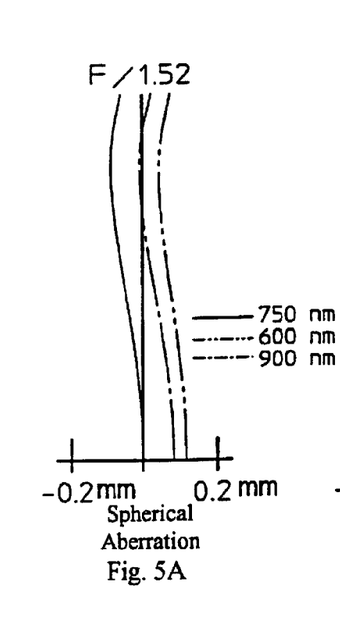
FIGS. 5A–5D show various aberrations of the large numerical aperture objective lens of Embodiment 3 of the present invention.
Figure 5B:
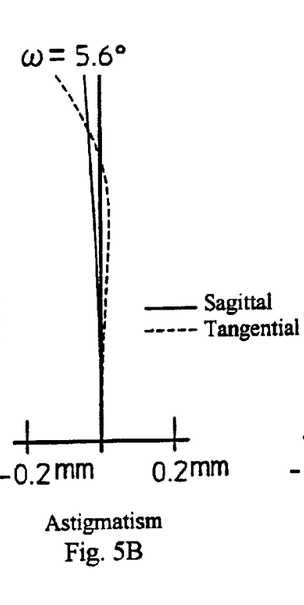
Figure 5C:
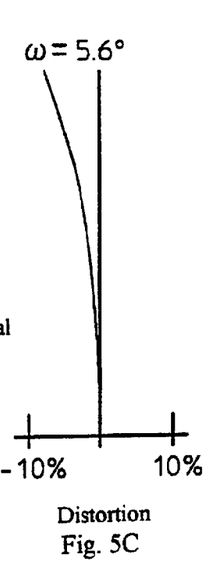
Figure 5D:
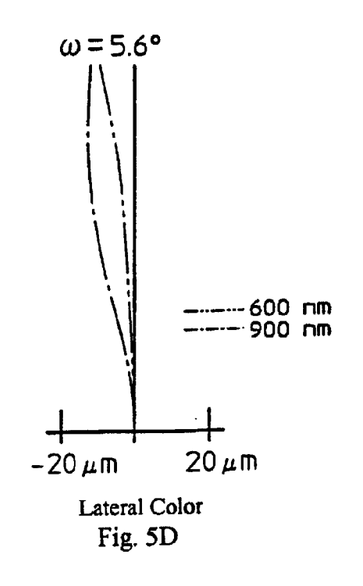
Figure 6A:
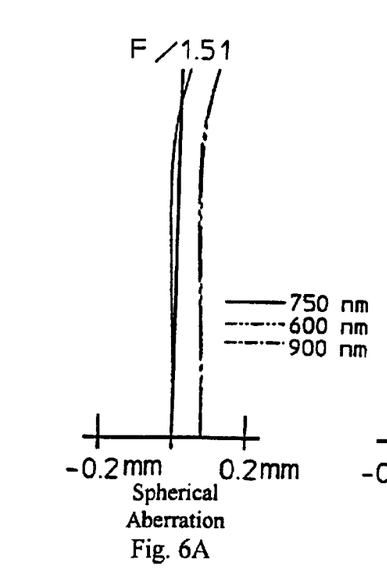
FIGS. 6A–6D show various aberrations of the large numerical aperture objective lens of Embodiment 4 of the present invention.
Figure 6B:
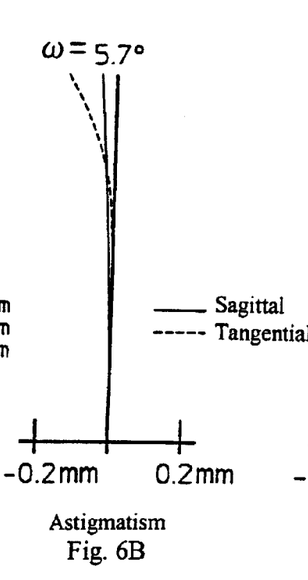
Figure 6C:
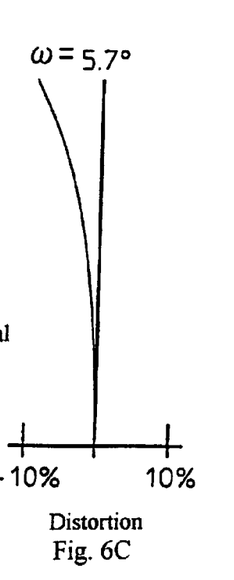
Figure 6D:
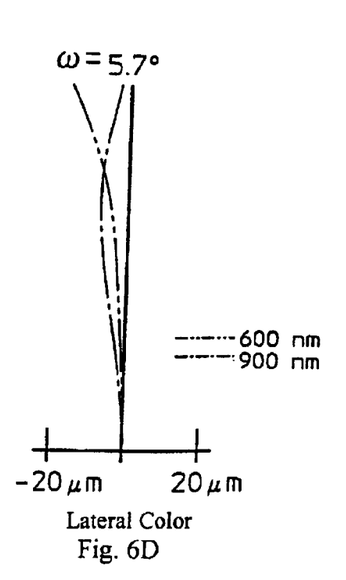

FIG. 2 shows the basic lens element configuration of a night vision optical device that includes the large numerical aperture objective lens shown in FIG. 1. In FIG. 2, the lens barrel 5 is shown using chain lines with two dots in each link. The night vision optical device includes a large numerical aperture objective lens 10, a photoelectron amplifier tube 2, and an eyepiece 4, which are held in place within the lens barrel 5. A light beam from an object is converged by the large numerical aperture objective lens 10 and is imaged onto the rear surface of a face plate 1 located at point P. The rear surface of face plate 1 is the input surface to the photoelectron amplifier tube 2. Thus, the image intensity is enhanced by the action of the photoelectron amplifier tube 2, and may be observed from the eye position E.P. via the eyepiece 4 by an observer as an image having increased brightness.

The purposes of Conditions (1)–(7) will now be described.

Condition (1) specifies the focal length of the first lens group $G_1$ relative to the focal length of the objective lens. If the lower limit of Condition (1) is not satisfied, spherical aberration, coma and astigmatism generated by the first lens group become excessive, and it becomes difficult to favorably correct these aberrations. If the upper limit of Condition (1) is not satisfied, compactness of the objective lens will be difficult to obtain.

Condition (2) specifies the focal length of the second lens group $G_2$ relative to the focal length of the objective lens. If the lower limit of Condition (2) is not satisfied, spherical aberration, coma and astigmatism generated by the second lens group become excessive, and it becomes difficult to favorably correct these aberrations. If the upper limit of Condition (2) is not satisfied, compactness of the objective lens will be difficult to obtain.

Condition (3) specifies the radius of curvature of the surface of the third lens group nearest the object side. As this surface is convex, the function of this surface is to generate a large negative distortion. If the lower limit of Condition (3) is not satisfied, it becomes difficult to correct the coma and image surface curvature. If the upper limit of Condition (3) is not satisfied, it becomes difficult to generate sufficient negative distortion as needed by an objective lens for a night vision optical device.

Condition (4) specifies the on-axis spacing between the second lens group $G_2$ and the third lens group $G_3$. If the lower limit of Condition (4) is not satisfied, it becomes difficult to favorably correct the spherical aberration. If the upper limit of Condition (4) is not satisfied, compactness of the objective lens will be difficult to obtain.

Moreover, a light beam can be slowly converged in order to suppress the occurrence of high-order aberrations by forming the first lens group $G_6$, in order from the object side, of two positive lens elements $L_1$ and $L_2$, as well as of cemented lens elements $L_3$, $L_4$. The axial chromatic aberration can be favorably corrected by the cemented lens elements $L_3$, $L_4$ being formed of a negative lens element $L_3$ and a positive lens element $L_4$. Furthermore, the lateral color can be favorably corrected by the third lens group $G_3$ being a cemented lens formed of a positive lens element $L_6$ and a negative lens element $L_7$. Further, instead of using a cemented lens in each of the first lens group $G_1$ and the third lens group $G_3$, each cemented lens can instead be formed as two lens elements having roughly equal curvature and separated by an air space. Hereinafter, such lenses and cemented lenses will be termed "paired lenses". These paired lenses may also be arranged, in order from the object side, using a negative lens element and a positive lens element.

Thus, the present invention enables the objective lens to generate a large negative distortion in order to compensate for the large positive distortion generated by the eyepiece 4 for the night vision optical device, as well as to correct other aberrations and obtain a bright image using a compact objective lens having a large numerical aperture.

Moreover, as described below, it is desired that the lens elements of the large numerical aperture objective lens relating to the present invention are made of a material satisfying Conditions (5)–(7). However, as illustrated by some embodiments of the present invention, it is not necessary to satisfy all of the Conditions (5)–(7). For example, as in Embodiment 1, it is acceptable to satisfy Conditions (6) and (7) but not Condition (5). It is also acceptable to satisfy only Condition (5) and not Conditions (6) and (7).

This large numerical aperture objective lens becomes a lens suited to a night vision optical device by using lens elements that are made of material(s) satisfying the above Conditions (5)–(7). Generally, once an objective lens is incorporated into a night vision optical device, it is difficult to make positional adjustments, such as focusing. Therefore, a shift of focusing position due to temperature change becomes a problem in the case of using the night vision optical device under a temperature greatly different from normal temperature. Such a shift of focusing position occurs due to the index of refraction of the lens material changing with temperature, the linear expansion/contraction of the lens materials with increased/decreased temperature, and linear expansion/contraction of the said lens barrel 5 with increased/decreased temperature. In particular, aluminum is generally used as the construction material of the lens barrel due to such reasons as cost, weight, ease of manufacture and so on. However, the linear expansion coefficient of aluminum at the normal design temperature is as large as $23.1 \times 10^{-6}$, which thus causes a shifting in the focus position due to the lens barrel changing length with temperature change from the design temperature of the night vision optical device.

However, the above Conditions (5)–(7) specify performance criteria which the material(s) of the objective lens elements must satisfy, and which enable focus shifts due to temperature changes to be suppressed. If these conditions are not satisfied, compensation for the expansion/contraction of the lens barrel 5 due to temperature changes becomes difficult, and the focus position shifts to the object side when the temperature rises, and to the image side when the temperature falls. By satisfying Conditions (5), (6) and (7), the focusing of the objective lens shifts to the image side when the temperature rises and to the object side when the temperature falls. Thus, correction of the focusing position is obtained which compensates for the lens barrel expanding when the temperature rises, as well as for the lens barrel contracting when the temperature falls.

Specific embodiments of the present invention are described below.

Embodiment 1

FIG. 1 shows the basic lens element configuration of Embodiment 1. The first lens group $G_1$ is formed of, in order from the object side, a first lens element $L_1$ that is a positive meniscus lens with its convex surface on the object side, a second lens element $L_2$ that is a positive meniscus lens with its convex surface on the object side, and a cemented lens that is formed of a negative meniscus lens element $L_3$ with its concave surface on the image side cemented to a positive meniscus lens element with its convex surface on the object side. The second lens group $G_2$ is formed of a fifth lens element $L_5$ that is a negative meniscus lens with its convex surface on the object side. The third lens group $G_3$ is a cemented lens formed of lens elements $L_6$, $L_7$. The sixth lens element $L_6$ is biconvex with surfaces of different radii of curvature, and with the surface of smaller radius of curvature on the object side. The seventh lens element $L_7$ is biconcave with surfaces having different radii of curvature, and with the surface of smaller radius of curvature on the image side.

Table 1 below lists the surface number # in order from the object side, the radius of curvature R (in mm) of each surface, the on-axis spacing D (in mm) between surfaces, as well as the index of refraction $N_d$ and the Abbe number $\upsilon_d$ (both at the d line) of each lens element of the objective lens of Embodiment 1. Moreover, values corresponding to the above Conditions (1)–(4) for Embodiment 1 are shown in the middle section of Table 1. Values relating to the above Conditions (6) and (7) and the focusing position shift ΔBF when the large numerical aperture objective lens of this embodiment is mounted to an aluminum lens barrel and the temperature rises from 20° C. to 40° C. are shown in the lower section of Table 1. The nearer the values ΔBF are to zero, the smaller the shift of focusing position due to temperature change.

TABLE 1

| # | R | D | $N_d$ | $\upsilon_d$ |
|---|---|---|---|---|
| 1 | 119.310 | 6.57 | 1.618 | 63.4 |
| 2 | 485.620 | 0.65 | | |
| 3 | 52.817 | 12.13 | 1.618 | 63.4 |
| 4 | 156.400 | 0.65 | | |
| 5 | 53.877 | 3.52 | 1.805 | 25.5 |
| 6 | 32.007 | 11.67 | 1.697 | 55.5 |
| 7 | 61.614 | 6.78 | | |
| 8 | 243.470 | 2.41 | 1.593 | 35.5 |
| 9 | 29.356 | 65.60 | | |
| 10 | 20.254 | 10.85 | 1.773 | 49.6 |
| 11 | −40.175 | 2.26 | 1.689 | 31.2 |
| 12 | 24.872 | 6.15 | | |
| 13 | ∞ | 5.09 | 1.498 | 65.1 |
| 14 | ∞ | | | | f = 100.0 (mm)
$|f_{G1}|/f = 0.6856$   $|f_{G2}|/f = 0.5655$
$|R_{G31}|/f = 0.2026$   $D_{G2G3}/f = 0.6562$

| | Refractive Power | dn/dT | α |
|---|---|---|---|
| First lens element $L_1$ | positive | $-2.6 \times 10^{-6}$ | $9.2 \times 10^{-6}$ |
| Second lens element $L_2$ | positive | $-2.6 \times 10^{-6}$ | $9.2 \times 10^{-6}$ |

Focusing position shift: ΔBF = −0.022 mm

As is evident from Table 1, Embodiment 1 satisfies the above Conditions (1)–(4), (6) and (7).

FIGS. 3A–3D show the spherical aberration, astigmatism, distortion and lateral color, respectively, for Embodiment 1.

Embodiment 2

The large numerical aperture objective lens of Embodiment 2 has the same basic lens element configuration as that of Embodiment 1.

Table 2 below lists the surface number # in order from the object side, the radius of curvature R (in mm) of each surface, the on-axis spacing D (in mm) between surfaces, as well as the index of refraction $N_d$ and the Abbe number $\upsilon_d$ (both at the d line) of each lens element of the objective lens of Embodiment 2. Values corresponding to the above Conditions (1)–(4) for Embodiment 2 are shown in the middle section of Table 2. Values relating to the above Condition (5) and the focusing position shift ΔBF when the large numerical aperture objective lens of this embodiment is mounted to an aluminum lens barrel and the temperature rises from 20° C. to 40° C. are shown in the lower section of Table 2. The nearer the values ΔBF are to zero, the smaller the shift of focusing position due to temperature change.

TABLE 2

| # | R | D | $N_d$ | $\upsilon_d$ |
|---|---|---|---|---|
| 1 | 94.991 | 7.59 | 1.603 | 60.6 |
| 2 | 540.470 | 0.56 | | |
| 3 | 48.226 | 10.37 | 1.603 | 60.6 |
| 4 | 122.620 | 0.65 | | |
| 5 | 48.351 | 3.24 | 1.805 | 25.4 |
| 6 | 29.314 | 11.19 | 1.658 | 50.9 |
| 7 | 60.772 | 11.18 | | |
| 8 | 175.090 | 2.03 | 1.805 | 25.4 |
| 9 | 26.165 | 50.07 | | |
| 10 | 19.786 | 7.78 | 1.786 | 44.2 |
| 11 | −136.360 | 3.81 | 1.648 | 33.8 |
| 12 | 26.236 | 6.95 | | |
| 13 | ∞ | 5.05 | 1.487 | 70.4 |
| 14 | ∞ | | | | f = 100.0 (mm)
$|f_{G1}|/f = 0.6130$   $|f_{G2}|/f = 0.3844$
$|R_{G31}|/f = 0.1978$   $D_{G2G3}/f = 0.5006$

| | Refractive Power | dn/dT |
|---|---|---|
| Third lens element $L_3$ | negative | $10.1 \times 10^{-6}$ |
| Fifth lens element $L_5$ | negative | $10.1 \times 10^{-6}$ |

Focusing position shift: ΔBF = −0.039 mm

As is evident from Table 2, Embodiment 2 satisfies the above Conditions (1)–(5).

FIGS. 4A–4D show the spherical aberration, astigmatism, distortion and lateral color, respectively, for Embodiment 2.

Embodiment 3

The large numerical aperture objective lens of Embodiment 3 has the same basic lens element configuration as that of Embodiment 1.

Table 3 below lists the surface number # in order from the object side, the radius of curvature R (in mm) of each surface, the on-axis spacing D (in mm) between surfaces, as well as the index of refraction $N_d$ and the Abbe number $\upsilon_d$ (both at the d line) of each lens element of the objective lens of Embodiment 3. Moreover, values corresponding to the above Conditions (1)–(4) for Embodiment 3 are shown in the middle section of Table 3. Values relating to the above Condition (5) and the focusing position shift ΔBF when the large numerical aperture objective lens of this embodiment is mounted to an aluminum lens barrel and the temperature rises from 20° C. to 40° C. are shown in the lower section of Table 3. The nearer the values ΔBF are to zero, the smaller the shift of focusing position due to temperature change.

TABLE 3

| # | R | D | $N_d$ | $\upsilon_d$ |
|---|---|---|---|---|
| 1 | 54.632 | 10.65 | 1.517 | 64.2 |
| 2 | 201.860 | 0.46 | | |
| 3 | 51.685 | 9.65 | 1.517 | 64.2 |
| 4 | 165.130 | 0.46 | | |
| 5 | 38.682 | 3.24 | 1.785 | 25.7 |
| 6 | 28.037 | 10.65 | 1.623 | 56.9 |
| 7 | 53.545 | 4.02 | | |
| 8 | 262.460 | 2.78 | 1.762 | 26.6 |
| 9 | 24.065 | 53.69 | | |
| 10 | 20.144 | 8.12 | 1.720 | 50.3 |
| 11 | −74.321 | 3.24 | 1.648 | 33.8 |
| 12 | 30.127 | 2.31 | | |
| 13 | ∞ | 5.05 | 1.487 | 70.4 |
| 14 | ∞ | | | | f = 99.2 (mm)
$|f_{G1}|/f = 0.5276$  $|f_{G2}|/f = 0.3532$
$|R_{G31}|/f = 0.2030$  $D_{G2G3}/f = 0.5411$

| | Refractive Power | dn/dT |
|---|---|---|
| Third lens element $L_3$ | negative | $7.7 \times 10^{-6}$ |
| Fifth lens element $L_5$ | negative | $7.3 \times 10^{-6}$ |

Focusing position shift: ΔBF = −0.032 mm

As is evident from Table 3, Embodiment 3 satisfies the above Conditions (1)–(5).

FIGS. 5A–5D show the spherical aberration, astigmatism, distortion and lateral color, respectively, for Embodiment 3.

Embodiment 4

The large numerical aperture objective lens of Embodiment 4 has the same basic lens element configuration as that of Embodiment 1.

Table 4 below lists the surface number # in order from the object side, the radius of curvature R (in mm) of each surface, the on-axis spacing D (in mm) between surfaces, as well as the index of refraction $N_d$ and the Abbe number $\upsilon_d$ (both at the d line) of each lens element of the objective lens of Embodiment 4. Moreover, values corresponding to the above Conditions (1)–(4) for Embodiment 4 are shown in the middle section of Table 4. Values relating to the above Conditions (5)–(7) and the focusing position shift ΔBF when the large numerical aperture objective lens of this embodiment is mounted to an aluminum lens barrel and the temperature rises from 20° C. to 40° C. are shown in the lower section of Table 4. The nearer the values ΔBF are to zero, the smaller the shift of focusing position due to temperature change.

TABLE 4

| # | R | D | $N_d$ | $\upsilon_d$ |
|---|---|---|---|---|
| 1 | 92.362 | 7.59 | 1.618 | 63.3 |
| 2 | 358.610 | 0.93 | | |
| 3 | 50.240 | 10.37 | 1.618 | 63.3 |
| 4 | 144.750 | 0.28 | | |
| 5 | 47.014 | 3.24 | 1.805 | 25.4 |
| 6 | 29.706 | 11.19 | 1.667 | 48.3 |
| 7 | 55.105 | 11.18 | | |
| 8 | 175.090 | 2.03 | 1.805 | 25.4 |
| 9 | 26.165 | 50.07 | | |
| 10 | 19.786 | 7.78 | 1.786 | 44.2 |
| 11 | −136.360 | 3.81 | 1.648 | 33.8 |
| 12 | 26.236 | 6.95 | | |
| 13 | ∞ | 5.05 | 1.487 | 70.4 |
| 14 | ∞ | | | | f = 100.1 (mm)
$|f_{G1}|/f = 0.6116$  $|f_{G2}|/f = 0.3842$
$|R_{G31}|/f = 0.1977$  $D_{G2G3}/f = 0.5003$

| | Refractive Power | dn/dT | α |
|---|---|---|---|
| First lens element $L_1$ | positive | $-3.5 \times 10^{-6}$ | $10.1 \times 10^{-6}$ |
| Second lens element $L_2$ | positive | $-3.5 \times 10^{-6}$ | $10.1 \times 10^{-6}$ |
| Third lens element $L_3$ | negative | $10.1 \times 10^{-6}$ | |
| Fifth lens element $L_5$ | negative | $10.1 \times 10^{-6}$ | |

Focusing position shift: ΔBF = −0.001 mm

As is evident from Table 4, Embodiment 4 satisfies the above Conditions (1)–(7).

FIGS. 6A–6D show the spherical aberration, astigmatism, distortion and lateral color, respectively, for Embodiment 4.

As shown in the various aberration curves for each embodiment, the objective lenses of each embodiment have F numbers as low as 1.41–1.52 and a large negative distortion while suppressing the occurrence of other aberrations.

The invention being thus described, it will be obvious that the same may be varied in many ways. For example, the radii of curvature R and on-axis surface spacings D can be readily scaled to achieve a lens having a different focal length. Furthermore, although the large numerical aperture objective lens of the present invention is particularly useful when it is used in a night vision optical device, the use of the large numerical aperture objective lens in the invention is not restricted to night vision applications, as it can be useful in other applications as well. And, although the night vision optical device illustrated herein is of the monocular type, the night vision optical device can instead be made binocular by adding a second objective lens. Thus, such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. An objective lens comprising, in order from the object side:

a first lens group having positive refractive power and formed of, in order from the object side, two positive lens elements and an achromatic set of paired lens elements formed of a negative lens element and a positive lens element;

a second lens group having negative refractive power; and a third lens group having positive refractive power, the surface of the third lens group nearest the object side being convex;

wherein the following Conditions (1)–(4) are satisfied $$0.45<|f_{G1}|/f<0.9 \quad \text{Condition (1)}$$

$$0.3<|f_{G2}|/f<0.7 \quad \text{Condition (2)}$$

$$0.15<|R_{G31}|/f<0.6 \quad \text{Condition (3)}$$

$$0.4<D_{G2G3}/f<0.8 \quad \text{Condition (4)}$$

where f is the focal length of the objective lens, $f_{G1}$ is the focal length of the first lens group, $f_{G2}$ is the focal length of the second lens group, $R_{G31}$ is the radius of curvature of the surface of the third lens group nearest the object side, and $D_{G2G3}$ is the on-axis distance between the second lens group and the third lens group.

2. The objective lens of claim 1, said third lens group being formed of an achromatic set of paired lenses having overall positive refractive power that is formed of a positive lens element and a negative lens element.

3. The objective lens of claim 2, wherein at least one lens element, of among the lens elements having negative refractive power in the first and second lens groups, is made of a material satisfying the following Condition (5):

$$dn/dT>7\times10^{-6} \quad \text{Condition (5)}$$

where dn/dT is the temperature coefficient of the index of refraction of the material at room temperature.

4. The objective lens of claim 2, wherein at least one element in said first lens group is made of a material satisfying the following Conditions (6) and (7):

$$dn/dT<0 \quad \text{Condition (6)}$$

$$\alpha>9\times10^{-6} \quad \text{Condition (7)}$$

where dn/dT is the temperature coefficient of the index of refraction of the material at room temperature, and α is the linear expansion coefficient of the material at room temperature.

5. A night vision optical device, comprising the objective lens of claim 2 in combination with a photoelectron amplifier tube and an eyepiece.

6. The objective lens of claim 1, wherein at least one lens element, of among the lens elements having negative refractive power in the first and second lens groups, is made of a material satisfying the following Condition (5):

$$dn/dT>7\times10^{-6} \quad \text{Condition (5)}$$

where dn/dT is the temperature coefficient of the index of refraction of the material at room temperature.

7. The objective lens of claim 3, wherein at least one element in said first lens group is made of a material satisfying the following Conditions (6) and (7):

$$dn/dT<0 \quad \text{Condition (6)}$$

$$\alpha>9\times10^{-6} \quad \text{Condition (7)}$$

where dn/dT is the temperature coefficient of the index of refraction of the material at room temperature, and α is the linear expansion coefficient of the material at room temperature.

8. A night vision optical device, comprising the objective lens of claim 6 in combination with a photoelectron amplifier tube and an eyepiece.

9. The objective lens of claim 1, wherein at least one lens element in said first lens group is made of a material satisfying the following Conditions (6) and (7):

$$dn/dT<0 \quad \text{Condition (6)}$$

$$\alpha>9\times10^{-6} \quad \text{Condition (7)}$$

where dn/dT is the temperature coefficient of the index of refraction of the material at room temperature, and α is the linear expansion coefficient of the material at room temperature.

10. A night vision optical device, comprising the objective lens of claim 9 in combination with a photoelectron amplifier tube and an eyepiece.

11. A night vision optical device, comprising the objective lens of claim 1 in combination with a photoelectron amplifier tube and an eyepiece.

* * * * *

UNITED STATES PATENT AND TRADEMARK OFFICE
CERTIFICATE OF CORRECTION

PATENT NO. : 6,839,186 B2
DATED : January 4, 2005
INVENTOR(S) : Nagatoshi et al.

It is certified that error appears in the above-identified patent and that said Letters Patent is hereby corrected as shown below:

Column 4,
Line 16, change "first lens group $G_6$" to -- first lens group $G_1$ --; and Column 10,
Line 19, change "of claim 3" to -- of claim 6 --.

Signed and Sealed this

Twenty-fourth Day of May, 2005

JON W. DUDAS
*Director of the United States Patent and Trademark Office*